United States Patent [19]

MacKenzie

[11] 4,406,928

[45] Sep. 27, 1983

[54] MULTI-PURPOSE TELEPHONE HOLDER APPARATUS

[75] Inventor: William G. MacKenzie, Middletown, N.J.

[73] Assignee: International Telephone and Telegraph Corporation, New York, N.Y.

[21] Appl. No.: 250,461

[22] Filed: Apr. 2, 1981

[51] Int. Cl.$^3$ ............................................. H01M 1/04
[52] U.S. Cl. ......................... 179/146 R; 179/100 R; 179/100 C; 179/103
[58] Field of Search ............... 179/103, 146 R, 100 C, 179/100 R, 147

[56] References Cited

U.S. PATENT DOCUMENTS

| | | | |
|---|---|---|---|
| 2,163,006 | 6/1930 | Obergfell | 179/100 |
| 3,176,062 | 3/1965 | Nordstrom et al. | 174/52 |
| 3,878,343 | 5/1975 | Van De Wall | 179/100 R |
| 3,898,394 | 8/1975 | Ward et al. | 179/146 |
| 3,946,977 | 3/1976 | Kunfus | 248/126 |
| 4,163,874 | 8/1979 | Lenaerts et al. | 179/100 R |
| 4,250,356 | 2/1981 | Hammer, Jr. et al. | 179/146 R |
| 4,251,696 | 2/1981 | MacKenzie | 179/103 |
| 4,284,855 | 8/1981 | Adams et al. | 179/100 C |

Primary Examiner—G. Z. Rubinson
Assistant Examiner—Robert Lev
Attorney, Agent, or Firm—John T. O'Halloran; Mary C. Werner

[57] ABSTRACT

A multi-purpose telephone holder is adapted to hold or position a compact telephone subset in three different orientations. The unit comprises a first tray module which essentially is a relatively rectangular housing configuration having sloping sidewalls, a back wall, an open front end and a bottom surface. A second assembly is a clip mechanism which is adapted to coact with the bottom surface of the tray and has two side retaining arms and two bottom arms for accommodating the subset in a vertical position. Suitable apertures are located in the bottom surface of the tray to enable the clip and tray to be positioned on a wall above a standard baseboard telephone jack. A third component consists of an adapter wall plate which has a peripheral flange for coacting with corresponding flanges on the bottom surface of the tray. The wall plate enables one to position the same over a standard modular wall plate jack and to then secure the tray and clip mechanism to the adapter plate to enable the user to mount the subset over the modular wall plate jack with a minimum of effort and mechanical skill.

19 Claims, 15 Drawing Figures

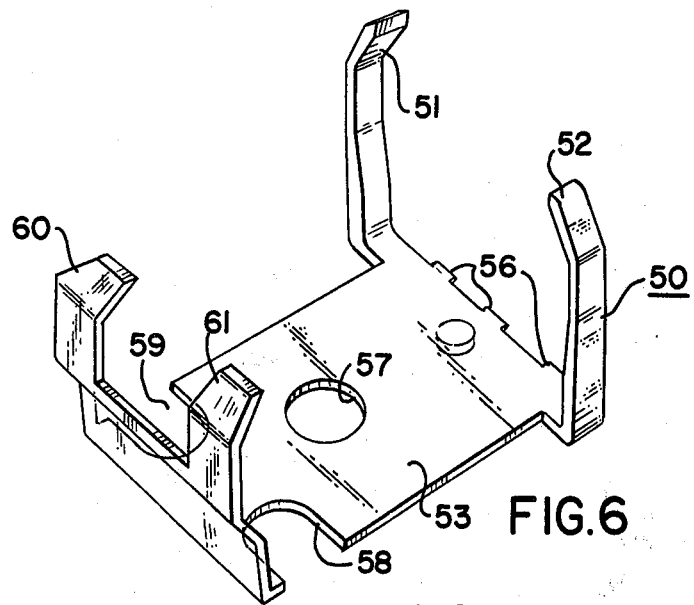
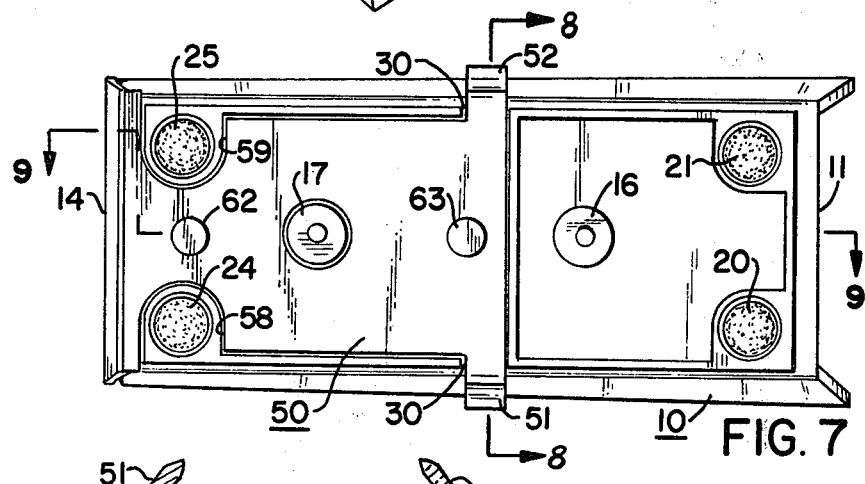
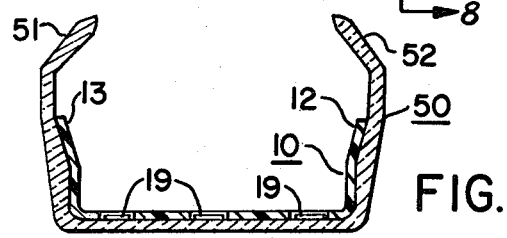
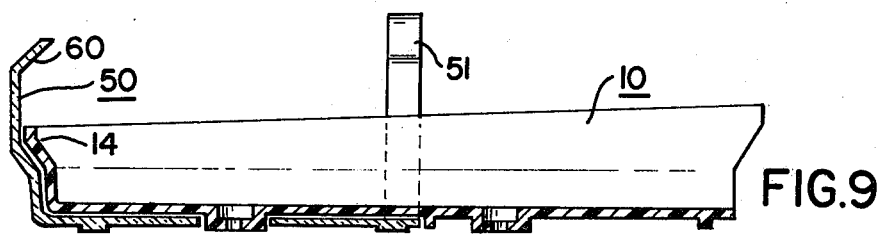

MULTI-PURPOSE TELEPHONE HOLDER APPARATUS

BACKGROUND OF THE INVENTION

This invention relates to a holder for a telephone subset and more particularly to such a holder capable of holding or accommodating a telephone in multiple positions for different applications.

The prior art is replete with a wide variety of alternate housing configurations and designs for a telephone subset. Under present circumstances, the consumer is free to purchase a subset according to his aesthetic preferences and to utilize the subset with the operating telephone company's lines and equipment. In order to accomplish this, the telephone company normally supplies wall-jacks into which the purchased subset is plugged or otherwise coupled to.

Telephone subsets as indicated above come in various configurations and are employed in different operating positions. Accordingly, such subsets may be utilized on a desk top or other surface and appear different than subsets which are mounted on the wall. It is, of course, understood that certain desk mounted subsets such as those supplied by the telephone company can be adapted for mounting on the wall utilizing a permanent type of connection. As indicated, a desk mounted subset is normally plugged into a wall jack or otherwise. In regard to a wall mounted subset, the telephone company provides a wall plate which has a jack positioned thereon and once the consumer orders a wall mounted subset, the unit is conventionally plugged into the jack associated with the wall plate.

It is desirable to provide a universal holder for a compact type telephone subset, which holder is relatively inexpensive, easy to install, while enabling one to accommodate the compact telephone subset in a plurality of different positions to thereby enable the same exact subset to be utilized as a desk subset or as a wall mounted subset. When referring to a compact telephone subset, there exists a plurality of subsets which are relatively small in volume and are aesthetically designed to offer the consumer both convenience and ease in placing calls and using the subset for telephone conversation.

An example of a particularly unique compact subset which is of the type to be accommodated by a telephone holder according to this invention is shown in U.S. Pat. No. 4,251,696 entitled COMPACT TELESCOPING TELEPHONE SET issued on Feb. 17, 1981 to William G. MacKenzie et al, the Inventor herein and assigned to the International Telephone and Telegraph Corporation, the Assignee herein. The telephone set according to this patent is a relatively compact instrument and provides a telescoping operation for on and off hook activation. The unit includes a first composite housing which has an internal hollow, which housing contains a dialer mechanism and telephone receiver. The housing has an open front end which includes guide means for allowing a slidable housing member containing a telephone transmitter to slide within the first housing section to enable the telescoping operation. The telephone described in the patent is extremely compact and further possesses great aesthetic appeal and hence, is a highly popular unit.

It is an object of the present invention, as above indicated, to provide a telephone holder for accommodating a compact telephone subset, which holder is capable of holding or accommodating the subset in multiple positions for different applications. The telephone holder according to this invention is extremely simple to fabricate and to install and possesses relatively few parts to enable installation of the same and use of the same by an inexperienced consumer.

BRIEF DESCRIPTION OF THE PREFERRED EMBODIMENT

A multi-purpose telephone holder apparatus for accommodating a telephone subset in a plurality of positions as wall mounted and table top mounted, comprising a tray housing member having a bottom surface, first and second sidewalls and a back wall, with an opened top and an opened front end, to form a recess for accommodating said telephone subset, with the back of said bottom surface containing retention means, a clip member having a planar base with first and second extending flexible arms directed from the top of said base, with said arms being arcuate and directed upwardly towards one another, with the distance between said arms at said base being slightly larger than the width of said tray and the length of said base being less than the length of said tray housing, said base having a third bottom arm extending upwardly from the bottom of said base member and directed inwardly towards said arms and locking means located on a surface of said base member adapted to coact with said retention means to hold said clip to said tray with said first, second and third arms extending over said recess.

BRIEF DESCRIPTION OF THE DRAWINGS

Above-mentioned and other features and objects of this invention will become more apparent by reference to the following description taken in conjunction with the accompanying drawings, in which:

FIG. 6 is a perspective plan view of a retainer clip according to this invention;

FIG. 7 is a bottom plan view showing a clip mechanism secured to a tray mechanism;

FIG. 8 is a sectional view taken through line 8—8 of FIG. 7;

FIG. 9 is a sectional view taken through line 9—9 of FIG. 7;

DETAILED DESCRIPTION OF THE INVENTION

Figure 1:
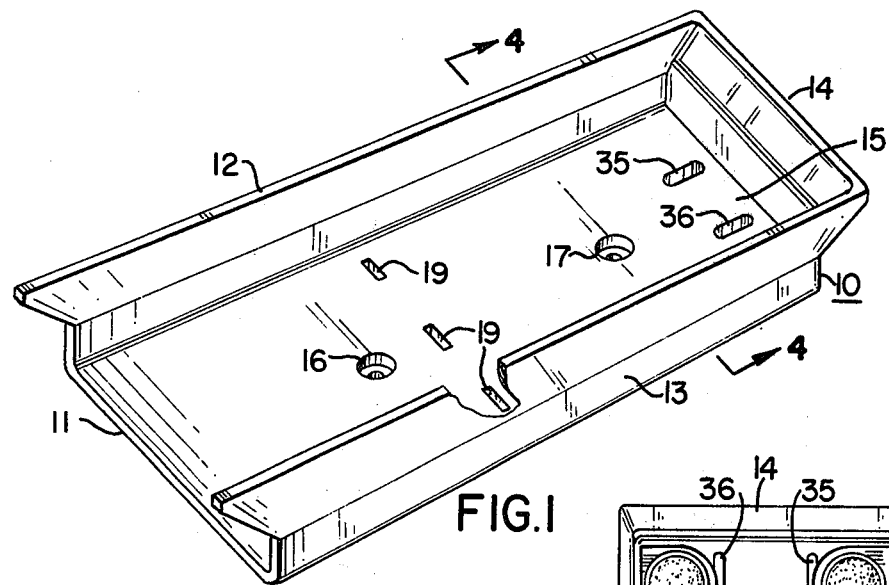
FIG. 1 is a perspective plan view of a tray assembly according to this invention.

Referring to FIG. 1, there is shown a tray member 10. As will be explained, the tray member is utilized as a main component of the assembly and allows the consumer to emplace the telephone subset in the tray for use on a table or as a desk top organizer. This is one holding position which the telephone holder assembly is capable of accommodating.

Essentially, the tray has a front open end 11, sloping left and right sidewalls 12 and 13, a sloping back wall 14 and a bottom planar surface 15. The planar surface 15 has two recessed apertures 16 and 17 for accommodating screws or fastening devices as will be explained. Also shown on the bottom surface are three rectangular apertures 19 which are employed to coact with a unique holding clip which also constitutes part of the telephone holder. The bottom surface 15 slopes upwardly from the front end 11 to the rear wall 14.

Figure 2A:
FIG. 2A is a partial sectional view showing a clip coacting aperture asembly.
Figure 2:
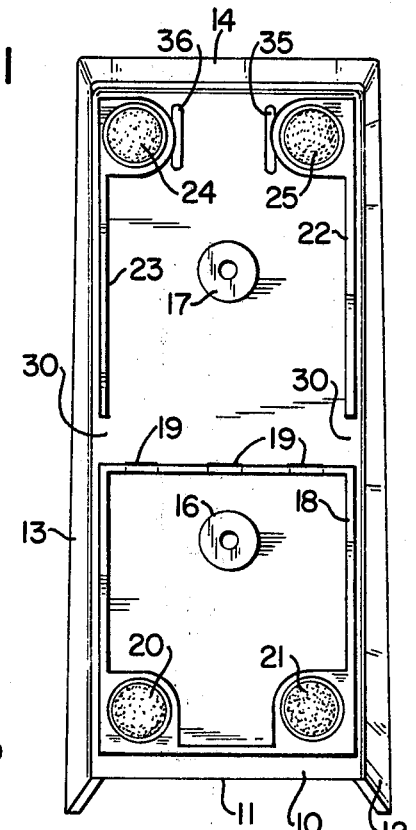
FIG. 2 is a bottom view of the tray assembly.

Referring to FIG. 2, there is shown a bottom plan view of the assembly depicted in FIG. 1. Located on the bottom surface is a first rectangular extending flange 18 which is directed about a projecting boss through which the recessed aperture 16 in the top surface is directed through. Located at the right and left bottom edges are two rubber feet 20 and 21 which allow the tray 10 to rest upon a surface such as a desk top and so on. Two similar flanges 22 and 23 are shown near the top portion of the tray 10. Each flange extends to about the same height as the flange 18 and there is also included two additional rubber or elastomeric feet 24 and 25 which function as 20 and 21. The apertures 19 are directed from the top surface 15 to the bottom surface at an angle and protrude from the bottom of the flange 18 as directed across the width of tray 10.

Figure 4:
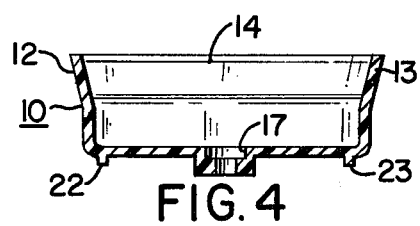
FIG. 4 is a sectional view taken through line 4—4 of FIG. 1.
Figure 3:
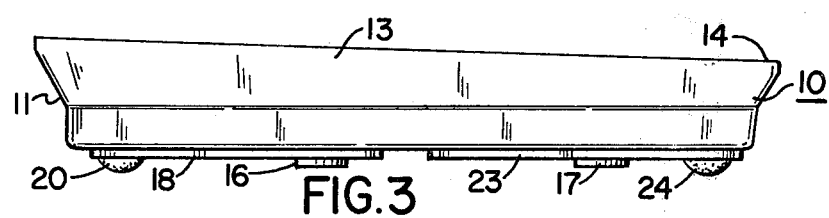
FIG. 3 is a side elevational view of the tray.

Referring to FIG. 2A, this structure is now clearly shown. In FIG. 2, there is a space 30 between the bottom edges of flanges 22 and 23 and the front edge of the continuous flange 18. FIG. 3 depicts a side view of the unit or tray 10 showing the sloping sidewalls 13 and the general side configuration of the tray unit 10. Also shown in FIG. 1 and FIG. 2 are two top slits 35 and 36. FIG. 4 depicts a sectional view of the tray taken through line 4—4 of FIG. 1 in order to show the nature of the sidewalls.

Figure 5:
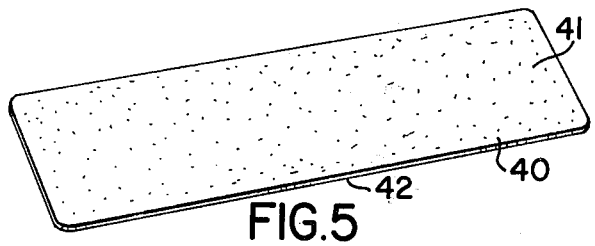
FIG. 5 is a perspective view of a decorative insert employed in this invention.

When the tray 10 is to be employed to accommodate a compact telephone in a table or desk top use, a sheet of vinyl or decorative plastic 40 is emplaced to cover the various recesses on the bottom surface 15 (FIG. 5). The sheet 40 is generally rectangular in configuration and has a decorative top surface 41 which may have a leather or other grain configuration. The bottom surface 42 is treated with a self-stick adhesive so that a paper backing can be peeled off this surface and the sheet 40 can then be placed over the bottom surface 15 of the tray 10. In this manner, the tray can be emplaced upon a suitable surface with the rubber feet or elastomeric projections as 20, 21, 24 and 25 resting on the surface.

The tray portion thus depicted is, of course, dimensioned to accommodate the compact telephone where a unit such as that depicted in U.S. Pat. No. 4,251,696 is emplaced therein with the dialer mechanism facing upwardly. The telephone cord which is attached to the subset is directed over sloping back wall 14.

Referring to FIG. 6, there is shown a unique clip assembly 50, which assembly is used in conjunction with the tray 10 in a wall mounting application. The retainer clip has two inwardly extending arms 51 and 52 which are integrally formed and coupled to the bottom planar surface 53. The top side of the bottom surface 53 contains three projections 56, which, as will be explained, are inserted into the sloped apertures 19 of the tray unit. An aperture 57 is also located on the planar surface 53 and is used to encircle the boss containing aperture 17 on the bottom surface of the tray 10.

The planar bottom surface has two U-shaped side recesses as 58 and 59, which recesses encircle the top portions of flanges 23 and 25 when the clip mechanism is emplaced on the bottom surface of the tray 10. The clip member 50 also has two front extending arms 60 and 61 which are directed over the back wall 14 of the tray 10 when the clip is emplaced in position. The entire retainer clip 50 is fabricated from a high impact plastic. The arms 51 and 52 are extremely flexible as they are not as wide as the arms 60 and 61.

Referring to FIG. 7 there is shown a bottom view depicting the retainer clip 50 coupled to the bottom surface of the tray 10. As can be seen from FIG. 7, the retainer clip also has two extending bosses 62 and 63 to provide strength and further protection. FIG. 8 depicts the pertinent numerals so that one can ascertain the coupling between the clip 50 and the tray 10, with the projections 56 inserted into apertures 19.

FIG. 8 is a cross section taken through lines 8—8 of FIG. 7 showing the side arms 51 and 52 extending above the sidewalls 12 and 13 of the tray 10.

FIG. 9 is a sectional view taken through line 9—9 of FIG. 7 showing the end projections as 60 and 61 extending over the back wall 14 of the tray 10.

Thus, as depicted, the clip can be simply emplaced upon the back surface of the tray 10 by having the projections 56 inserted into the apertures 19 with the aperture 57 encircling the boss 17 with the U-shaped recesses 58 and 59 encircling the flange containing the rubber feet 24 and 25.

As can be ascertained from FIG. 7, the tray 10 together with the clip 50, when emplaced in position with the tray, forms a wall mounting unit. Suitable fasteners are then positioned within apertures 16 and 17 and the entire assembly is screwed or otherwise fastened to a wall. The decorative sheet 40 is then emplaced on the front of the bottom surface of the tray 10 to cover the screws. The bottom arms of the clip as 60 and 61 serve to hold the telephone subset at its bottom surface, while the side arms as 50 and 52 coact with the telephone subset at the side surfaces.

Thus, the single clip mechanism 50 shown serves to hold the compact telephone subset in a vertical position and in a rigid and secure manner. When the user desires to remove the subset from the wall holder, he merely grasps the front of the subset and pulls slightly upwardly and out allowing the side clips 51 and 52 to flex.

Figure 10:
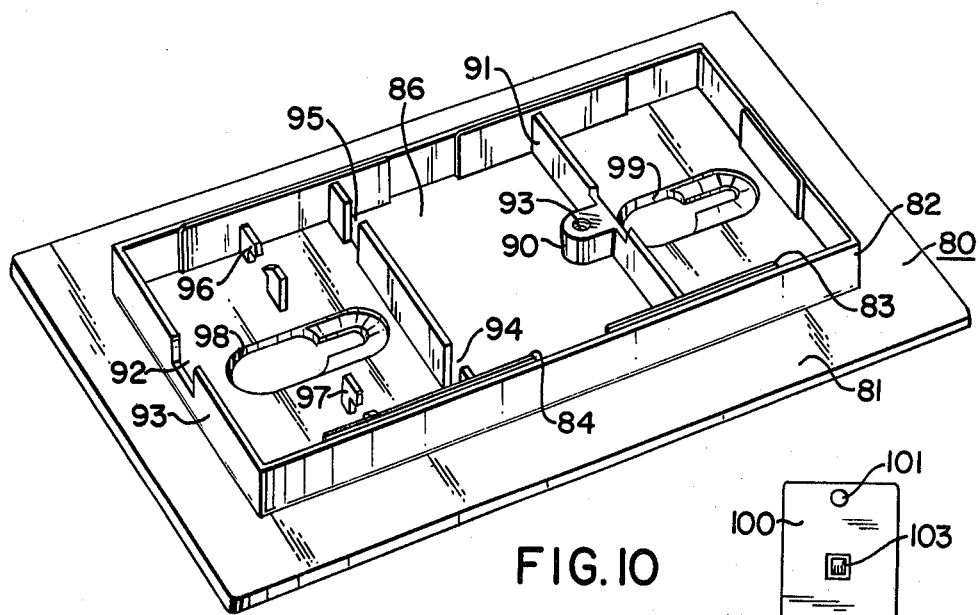
FIG. 10 is a perspective plan view depicting an adapter plate according to this invention.

Referring to FIG. 10, there is shown a perspective view of a wall plate adapter 80 which also can be employed together with the tray 10 and the clip 50. As can be seen, the wall plate adapter has a flat base surface 81 about which is positioned a rectangular flange 82. The flange 82 has extending rectangular projections as 83 and 84 and has a rectangular central aperture 86 for overlying the telephone jack normally associated with a wall plate. The adapter plate 80 is emplaced over the bottom surface of the tray 10 which also accommodates the clip 53. The inner flanges 83 and 84 are positioned to coact with the inner edges of the flanges 23, 22 and 18 of the tray 10.

Figure 11:
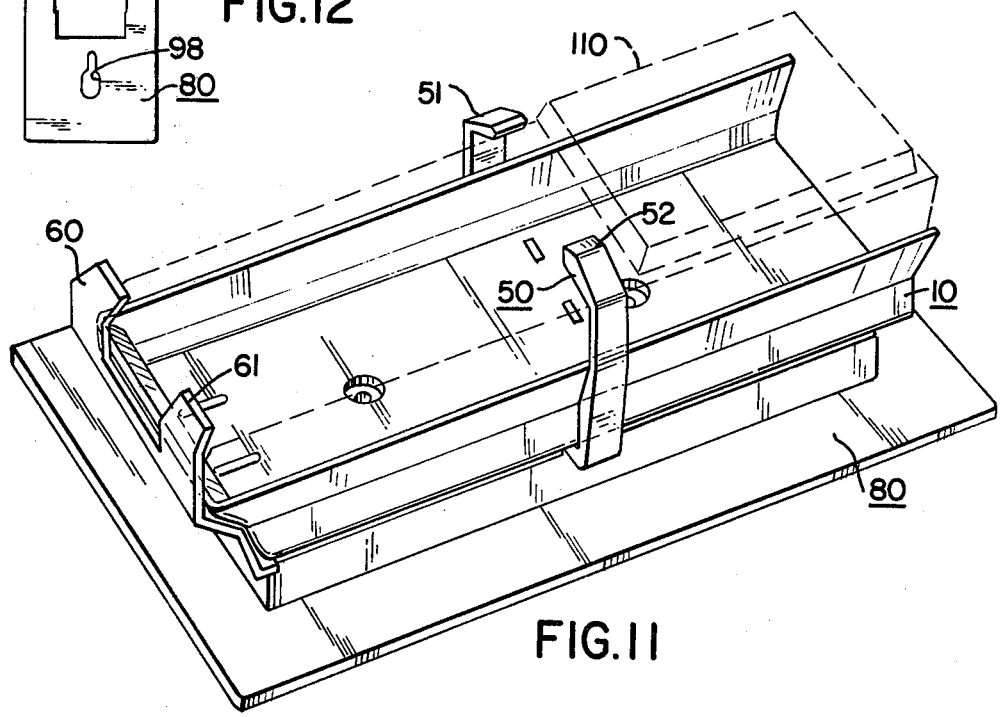
FIG. 11 is a perspective assembly view depicting the coupling of the tray, the clip and the adapter plate.

The flange 82 is congruent to flanges 18 and side flanges 22 and 23 so that when the adapter plate is emplaced on the bottom surface of the tray 10, the flanges coact to form an integral unit which is shown in FIG. 11.

In FIG. 11, a telephone subset 110 is also shown in dashed line configuration. As one can see from FIG. 11, the telephone 110 is firmly secured and held in place by both the bottom flanges 60 and 61 as well as the side clips 50 and 51. Due to the flexibility of the side clips, the user can grasp the telephone and easily remove the same from the holder as desired. When replacing the phone back in the holder, the clips 50 and 51, due to their beveled top edges, will flex outwardly to allow the phone to be simply placed and removed from the holder. It is, of course, understood that the assembly, when wall mounted, is in the vertical plane with the bottom clips 60 and 61 and the side clips firmly holding the subset 110 in position.

A circular boss 90 which extends from cross member 91 of the adapter plate contains a reset screw thread 93, which screw thread is aligned with aperture 16 to permanently secure the tray 10 containing clip 50 to the adapter plate 80. The rectangular aperture 92 in the front wall 93 of the adapter plate accommodates the telephone cord.

Figure 13:
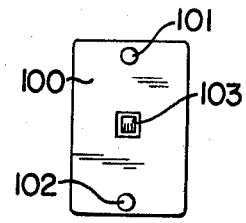
FIG. 13 is a top plan view of a typical standard modular wall plate jack.
Figure 12:
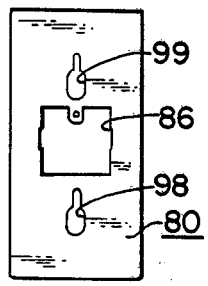
FIG. 12 is a top plan view of the adapter plate.

Also contained on the front surface of the adapter plate 80 as shown in FIG. 12, are two key-shaped apertures 98 and 99. These apertures are utilized to emplace the entire assembly over the wall plate containing the telephone jack. The wall plate is depicted in FIG. 13. The wall plate 100 conventionally contains projecting studs as 101 and 102 with the telephone jack 103 positioned relatively in the center of the plate.

In order to couple the above described assembly to the wall plate 100, one then slides apertures 90 and 98 over the studs 101 and 102. The modular plug associated with the telephone subset is then snapped into jack 103. The telephone cord is then routed through apertures 94 or 95 in the adapter plate and then through clips as 96 or 97 and directed through the aperture 92. Then the tray 10 with the clip 50 is then emplaced over the adapter plate 80 so that the flanges interlock as above described and a screw or bolt is inserted into aperture 16 to coact with the thread 93 contained in the boss 90 of the adapter plate 80. The unit is then conveniently and easily mounted in conjunction with the wall plate depicted in FIG. 13.

Figure 14:
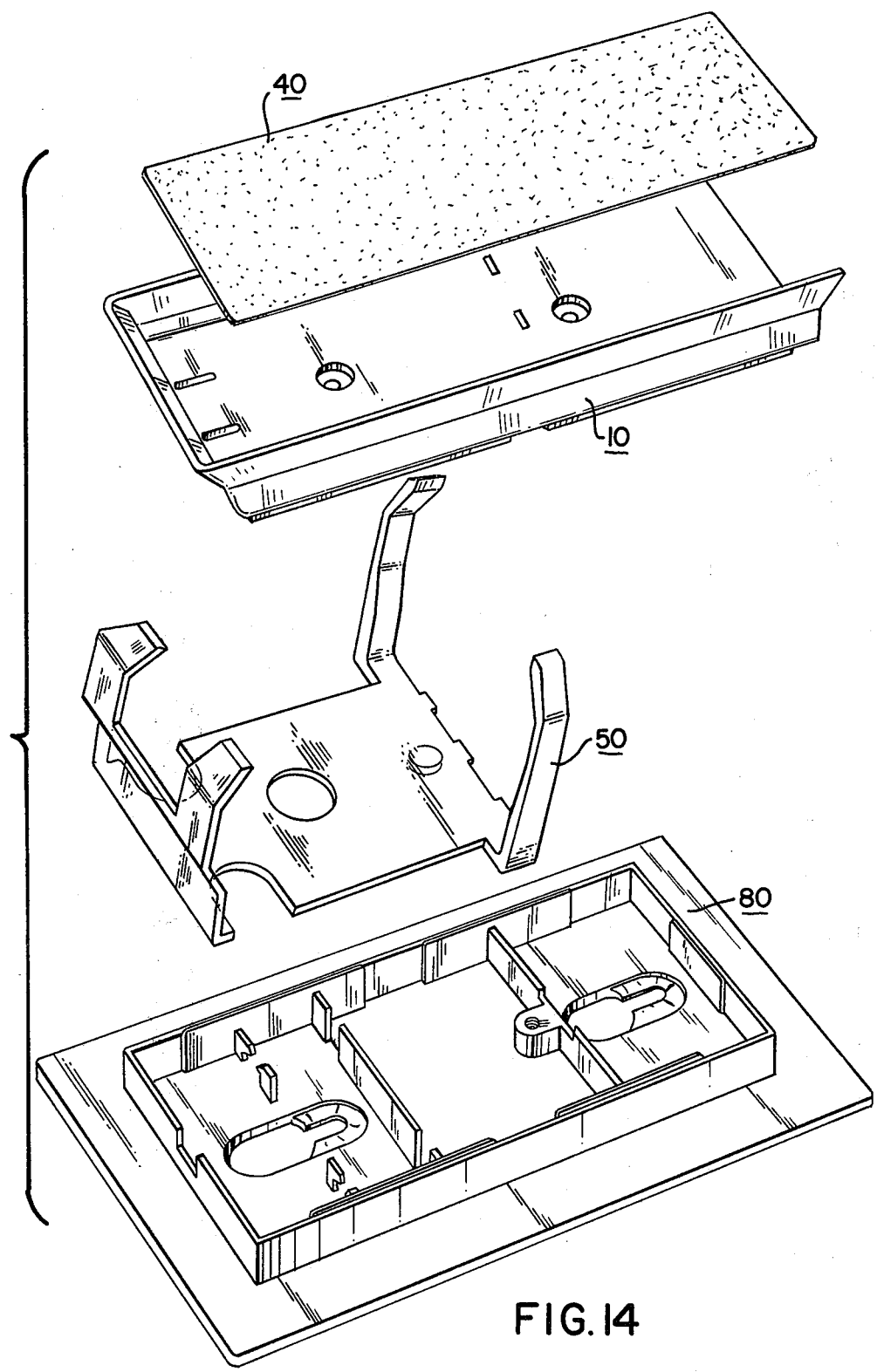
FIG. 14 is an assembly view useful in showing the coaction of various components employed in this invention.

For further clarity, FIG. 14 shows an assembly view depicting the adapter plate 80, the clip 50 and the tray 10 and one can see both from FIG. 14 and FIG. 11 how each component fits into one another. It is, of course, now understood that the components depicted could be provided in one package. The consumer would thus receive the basic tray 10, which can be employed together with sheet 40, to accommodate a compact telephone in a desk top orientation. If the consumer desires to mount the same exact telephone on a wall above a jack, he will employ the tray 10 and the retainer clip 50 together with two wood screws and the sheet 40. If the consumer desires to mount the instrument over a wall plate, he will employ all the components depicted in FIG. 14.

Thus, as one can see, the consumer is offerred great versatility in that the telephone holder provides a three-in-one usage that enables the consumer to display or employ a compact telephone subset on a table top or a wall. The telephone holder thus described can be used as a desk organizer or as a wall holder to hang the phone above a baseboard jack. Apart from these two uses, the assembly depicted can be employed as a wall mount over a standard modular wall plate jack. Accordingly, all of the necessary items for the various uses can be contained in one package, which would include the adapter plate 80, the retainer clip 50, the tray 10 and the decorative insert sheet 40 as well as three mounting screws to accommodate all operations.

It is, of course, understood that the tray 10, the clip 50 and the adapter plate 80 are all fabricated from plastic and can be molded in a simple and reliable manner, thus substantially reducing the cost to the consumer as well as to the manufacturer.

As indicated, the unit is particularly adapted to accommodate a telephone subset of the type shown in U.S. Pat. No. 4,251,696 but, as one can envision, the simple structure depicted can be modified to accommodate any similar type of subset in the unique and simple manner described above. Thus, one skilled in the art will be cognizant of many different modifications of the apparatus without departing from the spirit and scope of the invention as evidenced by the appended claims.

I claim:

1. Apparatus for receiving a telephone instrument in one of a vertical or horizontal positions, said telephone instrument including a telephone handset and a telephone subset incorporated in a handheld member, comprising in combination:
   a support member for holding said telephone instrument in a horizontal position and having a bottom surface with a back and a front, first and second sidewalls and a back wall, with an open top and an open front end; and
   a removable clip member mounted on said support member to grasp the telephone instrument when the support member is mounted in a vertical position, the clip member having a top, a bottom, a front, a back and a planar base with first and second flexible side arms and a bifurcated flexible bottom arm.

2. The apparatus as claimed in claim 1 further comprising clip retention means located on the back of said bottom surface of said support member and locking means located on the top of the base of said clip member, said clip retention means coacting with said locking means to hold said clip member to said support member in a secured position with said side arms extending over the open top of the support member and said bottom arm extending over the back end of the support member.

3. The telephone instrument receiving apparatus according to claim 2 wherein
   said retention means comprises a plurality of aligned apertures directed in a line across the width of the bottom surface of said support member and extending from the front of said bottom surface to the back of said bottom surface.

4. The telephone instrument receiving apparatus according to claim 2 wherein
   said locking means located on the base of said clip member comprises a plurality of projections positioned on the top of said planar base nearest said first and second side arms with said projections adapted to be inserted into said apertures.

5. The telephone instrument receiving apparatus according to claim 3 wherein
said back of said bottom surface of said support member has a locking flange directed across the width thereof, with said plurality of aligned apertures directed from the front of said bottom surface of said support member to the back of said bottom surface to terminate on said locking flange.

6. The telephone instrument receiving apparatus according to claim 1 further including
an elastomeric rest member positioned at each corner of said support member on the back of said bottom surface for supporting said support member on a horizontal surface.

7. The telephone instrument receiving apparatus according to claim 1 further including
an adapter plate member for mounting the support member in a vertical position having a planar bottom surface with an extending peripheral flange, with said flange including means for coacting with the bottom surface of said support member, said adapter plate having a large aperture for encircling a telephone modular wall plate jack.

8. The telephone instrument receiving apparatus according to claim 7 wherein
said back of said bottom surface of said support member includes a first extending flange section positioned on said back of said bottom surface near said open front end; with said flange section extending near and parallel to the sidewalls of said support member.

9. The telephone instrument receiving apparatus according to claim 8 wherein
said adapter plate flange is dimensioned to coact with said flange section to emplace said adapter plate on said support member.

10. Apparatus for retaining a telephone instrument in a plurality of positions, said telephone instrument including a telephone handset and a telephone subset incorporated in a handheld member, comprising:
support member configuration for holding said telephone instrument in a horizontal position having a bottom surface, with first and second sidewalls contiguous with a back wall and having an open top and an open front end, with the bottom surface having a front, a back and containing a plurality of aligned apertures directed between the sidewalls, a partial peripheral flange assembly having sides positioned on the back of said bottom surface, said flange having opposing recesses located on the sides of the flange; and
a removable clip assembly having a planar base member, said base member having a bottom, a top and side portions, said top portion having a plurality of projections for insertion into said apertures and a first and a second extending flexible arcuate arm directed upwardly from the sides of said base member near the top portion and inclined toward each other, with said planar base member having at least a third bottom arm extending upwardly from the bottom of said base member and directed inwardly towards said top arms, the width of said base member between said first and second arms being wider than the width of said support member with each of said first and second arms positioned in said recesses, whereby when said support member is accommodating said clip, said first and second arms extend over said sidewalls and said bottom arm extends over said back wall to cause a telephone instrument when emplaced in said support member to be retained therein by said arms to allow said telephone instrument to be accommodated in a plurality of positions.

11. The telephone instrument retaining apparatus according to claim 10 wherein
said sidewalls of said support member as directed from said bottom surface are tapered outwardly from said bottom surface.

12. The telephone instrument retaining apparatus according to claim 10 wherein
said back of said bottom surface of said support member has a locking flange having inner and outer surrfaces, said locking flange directed transverse to the sidewalls of said support member, with said plurality of aligned apertures directed from the front of said bottom surface of said support member to the back of said surface to terminate on said locking flange.

13. The telephone instrument retaining apparatus according to claim 10 wherein
said bottom surface of said support member further includes at least one aperture capable of accommodating a fastening member for mounting said support member and clip on a vertical surface.

14. The telephone instrument retaining apparatus according to claim 10 further including
four elastomeric supporting feet each positioned at one corner of said support member on the back of said bottom surface for supporting the support member on a horizontal surface.

15. The telephone instrument retaining apparatus according to claim 10 further including
an adapter plate member having a planar bottom surface with an extending peripheral flange, having sidewalls and a top and bottom wall, with said sidewalls spaced to coact with said peripheral flange of said support member, said adapter plate having a large aperture for encircling a telephone modular wall plate jack, means located on the inner surface of said sidewalls for underlying said support member flanges.

16. The telephone instrument retaining apparatus according to claim 15 further including
cable retaining means positioned on said adapter plate within the area surrounded by said adapter plate member flange.

17. The telephone instrument retaining apparatus according to claim 16 further including
a circular threaded boss coupled to said bottom surface of said adapter plate and extending into said large aperture to allow coupling of said support member to said adapter plate.

18. The telephone instrument retaining apparatus according to claim 10 further including
a decorative sheet insert of a planar configuration and congruent with the bottom surface of said support member, said sheet having a decorative top surface and an adhesive backed bottom surface for overlying and adhering to said bottom surface of said support member to cover the same.

19. The apparatus as claimed in claim 2 wherein said first and second flexible arms of the clip member extend from the top side of said base with said arms being arcuate and directed upwardly towards one another, with the distance between said side arms at said base being slightly greater than the width of said support member and the length of said base being less than the length of said support member, and said third arm extending upwardly from the bottom of said base and directed inwardly towards said arms.

* * * * *